(12) United States Patent
Lewallen et al.

(10) Patent No.: US 9,766,418 B2
(45) Date of Patent: Sep. 19, 2017

(54) SILICON-BASED OPTICAL PORTS, OPTICAL CONNECTOR ASSEMBLIES AND OPTICAL CONNECTOR SYSTEMS

(71) Applicant: Corning Optical Communications LLC, Hickory, NC (US)

(72) Inventors: Christopher Paul Lewallen, Hudson, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/950,064

(22) Filed: Nov. 24, 2015

(65) Prior Publication Data

US 2016/0147024 A1    May 26, 2016

Related U.S. Application Data

(60) Provisional application No. 62/084,598, filed on Nov. 26, 2014.

(51) Int. Cl.
| | |
|---|---|
| G02B 6/42 | (2006.01) |
| G02B 6/34 | (2006.01) |
| G02B 6/30 | (2006.01) |
| G02B 6/38 | (2006.01) |

(52) U.S. Cl.
CPC ........... *G02B 6/423* (2013.01); *G02B 6/4249* (2013.01); *G02B 6/4292* (2013.01); *G02B 6/30* (2013.01); *G02B 6/34* (2013.01); *G02B 6/3885* (2013.01); *G02B 6/4257* (2013.01)

(58) Field of Classification Search
None
See application file for complete search history.

(56) References Cited

U.S. PATENT DOCUMENTS

| | | | |
|---|---|---|---|
| 7,373,031 B2 * | 5/2008 | Wang | ................... G02B 6/4292 385/14 |
| 7,767,486 B2 | 8/2010 | Edris et al. | |
| | | (Continued) | |

OTHER PUBLICATIONS

Cui, Xiaoyun et al., "Glass as a Substrate for High Density Electrical Interconnect," Electronics Packaging Technology Conference, 2008, pp. 12-17.

*Primary Examiner* — Uyen Chau N Le
*Assistant Examiner* — Chad Smith
(74) *Attorney, Agent, or Firm* — Michael E. Carroll, Jr.

(57) ABSTRACT

Optical connector systems are disclosed. In one embodiment, an optical port includes a substrate, a laser silicon chip, an interposer, and a receptacle housing. The laser silicon chip includes an optical source, a laser beam emitting surface, and a grating at the laser beam emitting surface. The laser silicon chip is coupled to the substrate such that the laser beam emitting surface is transverse to the mounting surface of the substrate. The interposer includes an interposer fiber support bore, and is coupled to the laser beam emitting surface of the laser silicon chip such that the interposer fiber support bore is substantially aligned with the grating of the laser silicon chip. The receptacle housing includes a receptacle mating surface and defines an enclosure operable to receive a fiber optic connector. The receptacle mating surface includes a receptacle fiber support bore aligned with the interposer fiber support bore.

21 Claims, 20 Drawing Sheets

(56) References Cited

U.S. PATENT DOCUMENTS

| | | | | |
|---|---|---|---|---|
| 8,168,939 B2* | 5/2012 | Mack | ................... | H04B 10/503 |
| | | | | 250/225 |
| 8,737,845 B2* | 5/2014 | Fiorentino | ........... | G02B 6/4204 |
| | | | | 385/37 |
| 8,888,380 B2* | 11/2014 | Hung | ....................... | G02B 6/43 |
| | | | | 385/89 |
| 9,091,827 B2* | 7/2015 | Verslegers | ........... | G02B 5/1861 |
| 2011/0249947 A1 | 10/2011 | Wang et al. | | |
| 2011/0274438 A1* | 11/2011 | Fiorentino | ............... | G02B 6/34 |
| | | | | 398/141 |
| 2012/0257852 A1 | 10/2012 | Ogawa et al. | | |

* cited by examiner

SILICON-BASED OPTICAL PORTS, OPTICAL CONNECTOR ASSEMBLIES AND OPTICAL CONNECTOR SYSTEMS

PRIORITY APPLICATION

This application claims the benefit of priority under 35 U.S.C. §119 of U.S. Provisional Application Ser. No. 62/084,598, filed on Nov. 26, 2014, the content of which is relied upon and incorporated herein by reference in its entirety.

BACKGROUND

The present disclosure generally relates to high-bandwidth optical communication and, more particularly, to optical connector systems for use in high-bandwidth optical communication systems.

Benefits of optical fiber include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device.

As the bandwidth of optical transceiver devices increases by advanced techniques such as silicon-based laser systems and wavelength division multiplexing, large amounts of data must be electronically transferred from the active devices and associated electronics to electronic components of the computing device (e.g., a data switching device of a data center) for further processing (e.g., up to 100 Gbps per channel). Further, the size of optical transceiver devices (e.g., laser diodes, photodiodes) continues to decrease, which presents challenges in maintaining proper alignment between the transceiver device and the optical connector to which it is connected. Accordingly, alternative optical communication systems are desired.

SUMMARY

Embodiments are directed to optical ports, optical connector assemblies, and optical connector systems for high-bandwidth optical communication that transfer large amounts of data at high speeds between computing devices. Further, embodiments provide a silicon interposer disposed between a "tombstoned" silicon laser integrated circuit ("IC") chip and a receptacle housing to enable precise optical coupling between the laser silicon chip and one or more optical fibers of an optical connector. More specifically, the "tombstoned" (i.e., vertically mounted) laser silicon chip has a laser beam emitting surface that is transverse (e.g., orthogonal) with respect to a substrate to which the laser silicon chip is mounted. The laser beam emitting surface comprises one or more gratings that both turn a laser beam propagating within the laser silicon chip (e.g., within a waveguide) and perform a lensing function for optical coupling with one or more optical fibers. An interposer is coupled to the laser silicon chip to provide precise optical alignment of one or more optical fibers of an optical connector assembly with respect to the one or more gratings.

In this regard, in one embodiment, an optical port includes a substrate having a mounting surface, a laser silicon chip, an interposer, and a receptacle housing. The laser silicon chip includes an optical source operable to emit a laser beam, a laser beam emitting surface, and a grating at the laser beam emitting surface. The laser silicon chip is coupled to the substrate such that the laser beam emitting surface is transverse to the mounting surface of the substrate. The grating is operable to cause the laser beam to turn and be emitted from the laser beam emitting surface. The interposer includes an interposer fiber support bore, and is coupled to the laser beam emitting surface of the laser silicon chip such that the interposer fiber support bore is substantially aligned with the grating of the laser silicon chip. The receptacle housing includes a receptacle mating surface and defines an enclosure operable to receive a fiber optic connector comprising an optical fiber. The receptacle mating surface includes a receptacle fiber support bore. The receptacle housing is coupled to the mounting surface of the substrate such that the receptacle fiber support bore is substantially aligned with the interposer fiber support bore.

In another embodiment, an optical connector assembly includes a connector body, an optical fiber, and a shroud portion. The connector body includes a fiber enclosure portion having a connector mating surface and a connector fiber support bore, wherein the connector fiber support bore defines a connector fiber opening at the connector mating surface, and the connector body defines a fiber enclosure. The connector body further includes a first shroud actuation arm proximate a first side of the fiber enclosure portion, and a second shroud actuation arm proximate a second side of the fiber enclosure portion. The first shroud actuation arm has a first locking notch and the second shroud actuation arm comprising a second locking notch. The optical fiber is disposed within the connector fiber support bore such that a portion of the optical fiber extends out of the connector fiber opening and beyond a plane defined by the connector mating surface. The shroud body defines a shroud enclosure and includes a shroud mating surface, a shroud fiber support bore extending between the shroud enclosure and the shroud mating surface, a first shroud actuator seat positioned proximate a first side of the shroud enclosure, a second shroud actuator seat proximate a second side of the shroud enclosure, a first shroud actuator pin, and a second shroud actuator pin. Each of the first and second shroud actuator pins include a locking feature. When the connector body is disposed within the shroud body such that the fiber enclosure portion is disposed within the shroud enclosure, the first shroud actuation arm is disposed within the first shroud actuator seat, and the second shroud actuation arm is disposed within the second shroud actuator seat. The first shroud actuator pin is pivotally disposed within the first shroud actuator seat and the second shroud actuator pin is pivotally disposed within the second shroud actuator seat.

In yet another embodiment, an optical connector system includes an optical port and an optical connector assembly. The optical port includes a substrate having a mounting surface, a laser silicon chip, an interposer, and a receptacle housing. The laser silicon chip includes a laser beam emitting surface and a grating at the laser beam emitting surface. The laser silicon chip is coupled to the substrate such that the laser beam emitting surface is transverse to the mounting surface of the substrate. The interposer includes an interposer fiber support bore, wherein the interposer is coupled to the laser beam emitting surface of the laser silicon chip such that the interposer fiber support bore is substantially aligned with the grating of the laser silicon chip. The receptacle housing includes an receptacle mating surface and defining an enclosure. The receptacle mating surface includes a receptacle fiber support bore, and is coupled to the mounting surface of the substrate such that the receptacle fiber support bore is substantially aligned with the interposer fiber support bore. The optical connector assembly includes a connector body and an optical fiber. The connector body has a connector mating surface and a connector fiber support bore, wherein the connector fiber support bore defines a connector fiber opening at the connector mating surface, and the connector body defines a fiber enclosure portion. The optical fiber is disposed within the connector fiber support bore such that a portion of the optical fiber extends out of the connector fiber opening and beyond a plane defined by the connector mating surface. When the optical connector assembly is positioned within the enclosure defined by the receptacle housing, the optical fiber is disposed within the receptacle fiber support bore and the interposer fiber support bore such that an end of the optical fiber is offset from the grating of the laser silicon chip.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments are directed to optical ports, optical connector assemblies, and optical connector systems for silicon laser-based, high-bandwidth optical communication applications. More specifically, optical ports make use of a "tombstoned" (i.e., vertically mounted) silicon-based laser integrated circuit chip ("laser silicon chip") that includes all needed electrical functionality as well as provision to mate to a mother board substrate through a castellated interface. A laser emitting surface has grating regions that both turn laser beams propagating within the laser silicon chip such that the laser beams are emitted from the laser emitting surface. The gratings also perform a lensing function to couple the laser beams into respective optical fibers. The laser silicon chip is mated to an interposer that includes very accurate holes to position the optical fibers (e.g., single mode optical fiber) to the gratings. The ends of the optical fibers are offset from the gratings by a desired distance, such as by the use of hard stops, for example. Optical connector assemblies for mating with such optical ports are also disclosed. Various embodiments of optical ports, optical connector assemblies, and optical connector systems are described in detail below.

Figure 1:
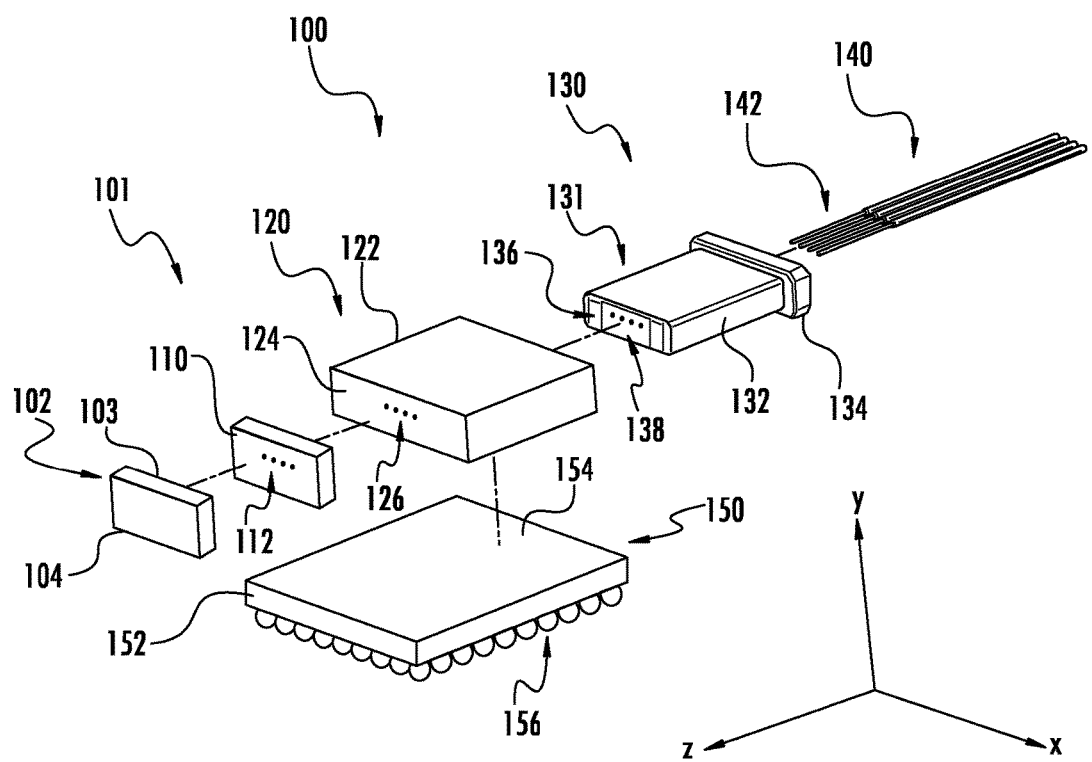
FIG. 1 is an exploded view of an example optical connector system comprising an optical port and an optical connector assembly according to one or more embodiments described and illustrated herein.

Referring now to FIG. 1, an example optical connector system 100 is a schematically illustrated in an exploded, perspective view. Generally, the optical connector system 100 includes an optical port 101 and an optical connector assembly 130. The optical port 101 includes a laser silicon chip 102, an interposer 110, and a receptacle 120 that are mounted to a substrate assembly 150. The illustrated substrate assembly 150 comprises a substrate 152 having a mounting surface 154 to which the optical port 101 is coupled. The substrate 152 may be made of a material such as FR-4, glass, ceramic and the like. The illustrated substrate assembly 150 further includes an electrical coupling surface 156 that may be used to electrically couple the optical connector system 100 to another circuit board. In the illustrated embodiment, the electrical coupling surface 156 is configured as a ball grid array interface. However, it should be understood that other electrical connection interface configurations may be utilized.

The laser silicon chip 102 may be configured as any silicon photonics chip, such as a hybrid laser silicon chip or a Raman laser silicon chip, for example. The laser silicon chip 102 comprises one or more optical sources (not shown) that produce one or more laser beams that propagate within the laser silicon chip 102 (e.g., within one or more waveguides 105 (see FIG. 5). Additionally or alternatively, the laser silicon chip 102 may include one or more photo detectors (not shown) operable to receive one or more laser beams propagating within the laser silicon chip 102 (e.g., within one or more waveguides 105) and, along with additional electrical components, convert the one or more laser beams into electrical signals.

The laser silicon chip 102 is mounted on a mounting surface 154 of the substrate assembly 150 in a tombstone-like arrangement such that it is vertically mounted on the mounting surface 154. In some embodiments, the laser silicon chip 102 comprises a ball grid array electrical connection interface 104 that is used to electrically connect the laser silicon chip 102 to the substrate assembly 150. It should be understood that electrical connection structures other than a ball grid array may be utilized.

The laser silicon chip 102 includes a laser emitting surface 103 that is transverse to the mounting surface 154 of the substrate assembly 150. In some embodiments, the laser emitting surface 103 is substantially orthogonal with respect to the mounting surface 154 of the substrate, but other orientations may be possible. As used herein, "transverse" or "substantially orthongonal" means that the angle may be within ±10 degrees of perpendicular. As described in more detail below, gratings 106 (see FIG. 5) are provided within the laser emitting surface 103 to optically turn laser beams propagating within laser silicon chip 102 such that they are emitted from the laser emitting surface 103. The gratings 106 also act as lenses to optically couple the optical fibers 140 to the laser emitting surface 103.

The laser silicon chip 102 is mated to the interposer 110. As described in more detail below, the interposer 110 comprises one or more interposer fiber support bores 112 configured to receive and maintain one or more optical fibers 140. It should be understood that, although the embodiments described and illustrated herein have four optical fibers 140, more or fewer optical fibers may be utilized. The interposer 110 is mated to the laser silicon chip 102 such that the interposer fiber support bores 112 of the interposer 110 are substantially aligned with the gratings 106 of the laser silicon chip 102. As used herein, "substantially aligned" with respect to the laser silicon chip 102 and the interposer 110 means that the laser silicon chip 102 and interposer 110 are aligned by a wafer scale alignment process with a tolerance of about ±1.0 µm such that an optical fiber may be positioned within the respective bores of the mated components.

As an example and not a limitation, the interposer fiber support bores 112 may be accurately fabricated using a deep reactive ion etching process. It should be understood that other bore fabrication methods may be utilized to achieve sub-micron level accuracy.

The interposer 110 may be fabricated from silicon to match the coefficient of thermal expansion ("CTE") of the laser silicon chip 102. As an example and not a limitation, the CTE of both the laser silicon chip 102 and the interposer 110 may be between about 3 ppm/° C. and about 4 ppm/° C.

In some embodiments, the interposer 110 includes electrical traces and/or other functionalities. For example, castellated vias may be provided in the interposer 110 to pass electrical signals from the laser silicon chip 102 to the interposer 110, which may then be passed to other components.

The receptacle 120 includes a receptacle body 122 that defines a receptacle enclosure 121 into which the optical connector assembly 130 is inserted. The receptacle body 122 has a receptacle mating surface 124 in which one or more receptacle fiber support bores 126 are provided. The receptacle body 122 is mounted to the mounting surface 154 of the substrate assembly 150 such that the receptacle fiber support bores 126 are substantially aligned with the interposer fiber support bores 112. The receptacle body 122 may be fabricated from any material having a low CTE, such as a low CTE polymer. As an example and not a limitation, the material of the of the receptacle body may have a CTE between about 6 ppm/° C. and about 17 ppm/° C.

The optical connector assembly 130 generally includes a connector body 131 and one or more optical fibers 140. The example connector body 131 includes a fiber enclosure portion 132 extending from a flange portion 134. It should be understood that embodiments are not limited to the example connector body 131 illustrated in FIG. 1. In some embodiments, the optical fibers 140 include a stripped portion 142 wherein one or more outer layers (e.g., outer jacket layers, coating layers, etc.) have been removed.

Figure 2A:
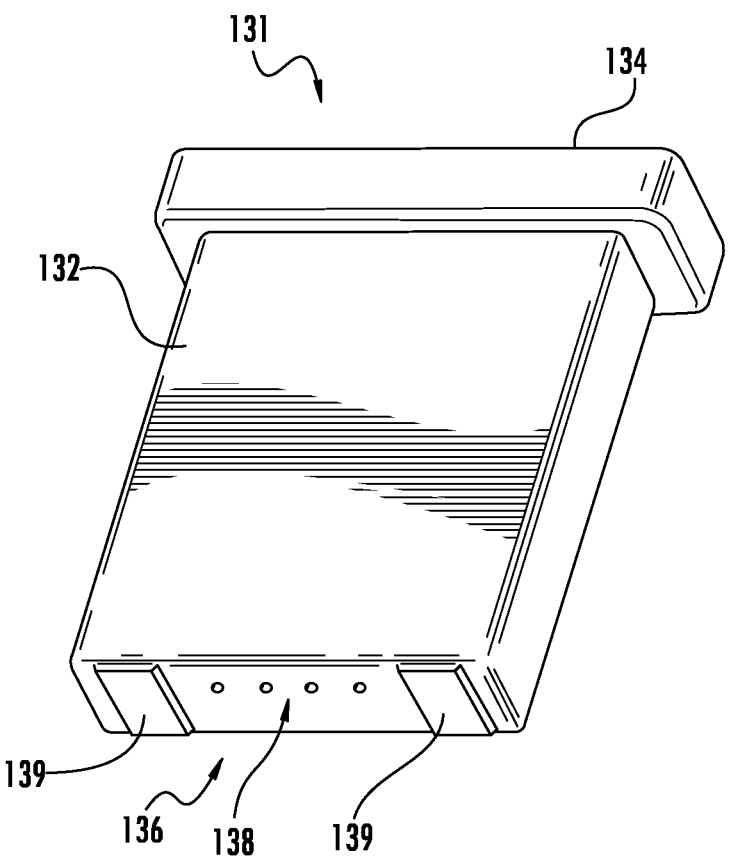
FIG. 2A is a front perspective view of an example connector body of the optical connector assembly depicted in FIG. 1.
Figure 2B:
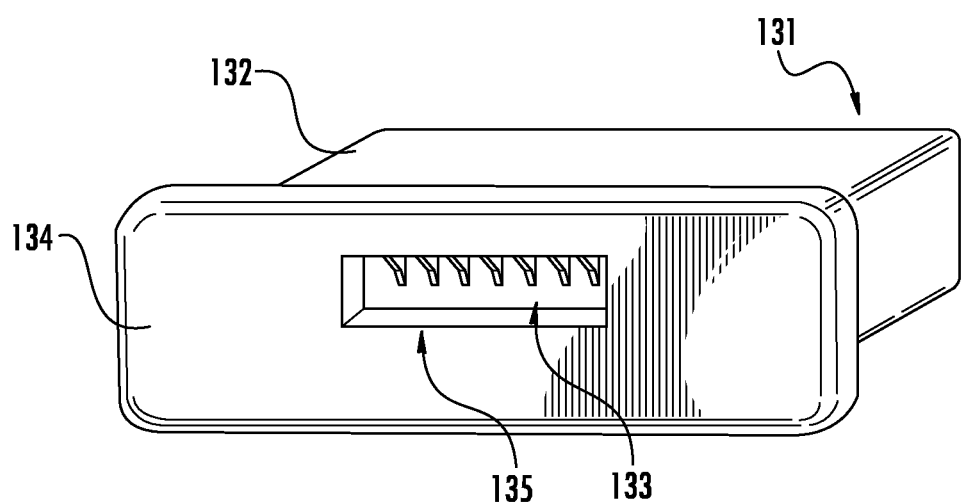
FIG. 2B is a rear perspective view of the example connector body depicted in FIG. 2A.
Figure 2C:
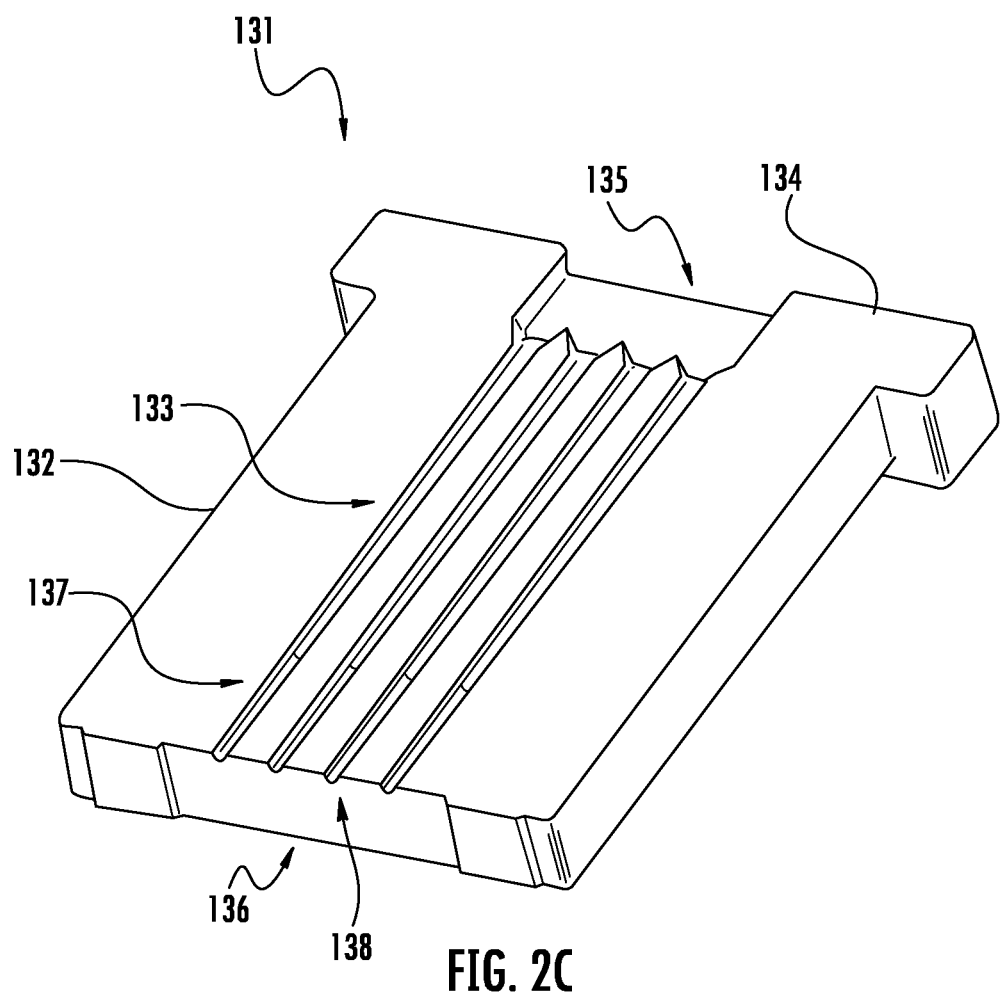
FIG. 2C is a cross sectional view of the example connector body depicted in FIGS. 2A and 2B.

FIGS. 2A-2C depict the example connector body 131 illustrated in FIG. 1. FIG. 2A is a front perspective view of the connector body 131, FIG. 2B is a rear perspective view of the connector body 131, and FIG. 2C is a cross sectional, perspective view of the connector body 131 showing internal features of the fiber enclosure portion 132. The connector body 131 may be fabricated from a relatively low CTE material. As an example and not a limitation, the connector body 131 body may be fabricated from a material having a CTE of about 50 ppm/° C. or less (e.g., polyetheimides). Referring to FIG. 2A, the fiber enclosure portion 132 has a connector mating surface 136 at which one or more fiber openings 138 are present. In some embodiments, the connector mating surface 136 includes datum features 139 that may be used to properly position the ends of the optical fibers 140 with respect to the laser silicon chip 102 as well as during laser processing steps.

Referring now to FIG. 2B, a rear surface of the flange portion 134 includes an opening 135 through which the optical fibers 140 are inserted. The opening 135 provides access to connector fiber support bores 133 sized and configured to receive and maintain the optical fibers 140. FIG. 2C depicts example connector fiber support bores 133. Any number of connector fiber support bores 133 may be provided depending on the desired application. In the illustrated embodiment, the connector fiber support bores 133 have a tapered portion 137 sized and configured to receive and maintain the stripped portion 142 of the optical fibers 140. This tapered lead-in may enable the tolerances of the connector body 131 (e.g., the position of the connector fiber support bores 133) to be relaxed. The diameter of the openings of the receptacle fiber support bores 126 at the receptacle mating surface 124 may be sized according to the diameter of the optical fiber 140. As an example and not a limitation, the diameter of the openings of the receptacle fiber support bores 126 at the receptacle mating surface 124 may be about 50 μm.

Figure 3:
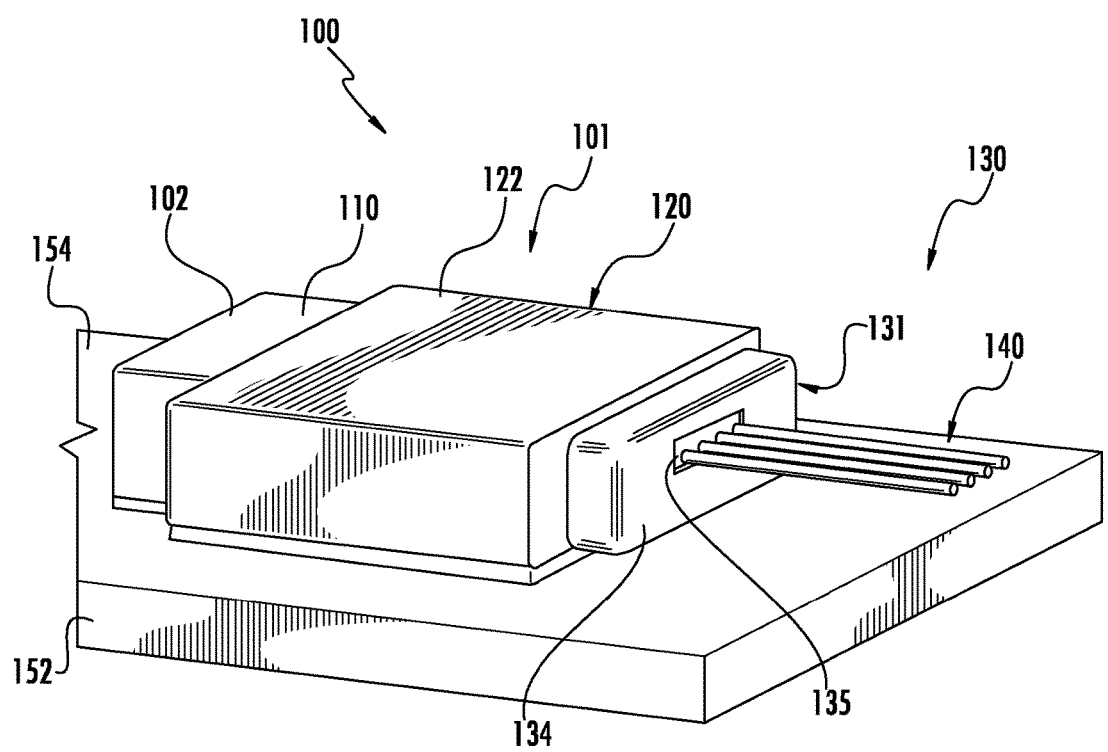
FIG. 3 is a perspective view of the optical connector system depicted in FIG. 1.

FIG. 3 is a perspective view of the optical connector assembly 130 inserted into the optical port 101 in a mated state. In the illustrated embodiment, the optical fibers 140 are secured within the connector body 131 by an adhesive. Although not shown in FIGS. 1, 2A-2C and 3, the connector body 131 may include one or more mechanical features for properly positioning the connector body 131 in the receptacle body 122, as well as to securely engage the connector body 131 within the receptacle body 122. In other embodiments, the connector body 131 is secured within the receptacle body 122 by bonding, such as by the use of an adhesive.

Figure 4A:
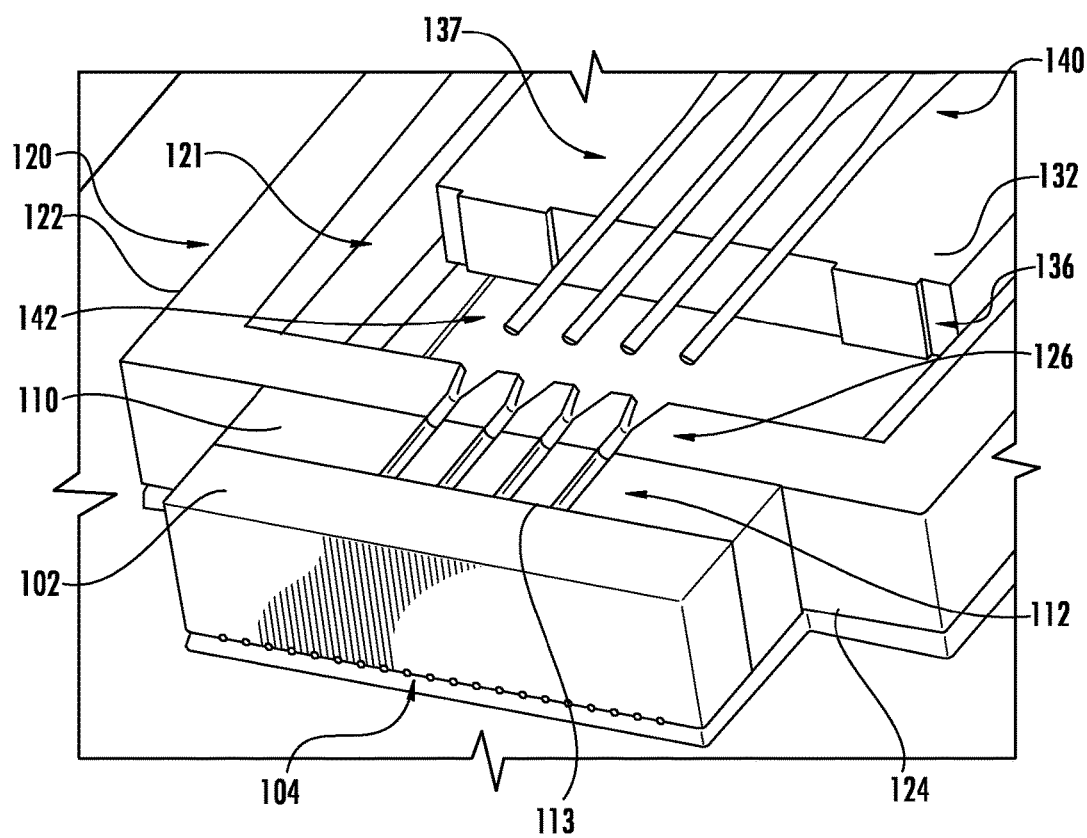
FIG. 4A is a close-up, perspective view of a laser silicon chip, interposer and receptacle body of an optical port with a partially inserted optical connector assembly of the optical connector system depicted in FIG. 1.

FIGS. 4A-4D depict cross sectional views of the optical connector assembly 130 in various positions with respect to the optical port 101. FIG. 4A depicts the optical connector assembly 130 partially inserted into the receptacle enclosure 121 defined by the receptacle body 122. Further, FIG. 4A depicts the mated relationship between the laser silicon chip 102, the interposer 110, and the receptacle mating surface 124 of the receptacle body 122.

The stripped portions 142 of the optical fibers 140 are fully disposed within the tapered portions of the connector fiber support bores 133. A portion of the stripped portion 142 of the optical fibers 140 extend beyond a plane defined by the connector mating surface 136 such that the protrude out of the fiber enclosure portion 132. As shown in FIG. 4A, the receptacle fiber support bores 126 within the receptacle body 122 may be tapered to assist in guiding the optical fibers 140 into the receptacle fiber support bores 126.

Figure 4B:
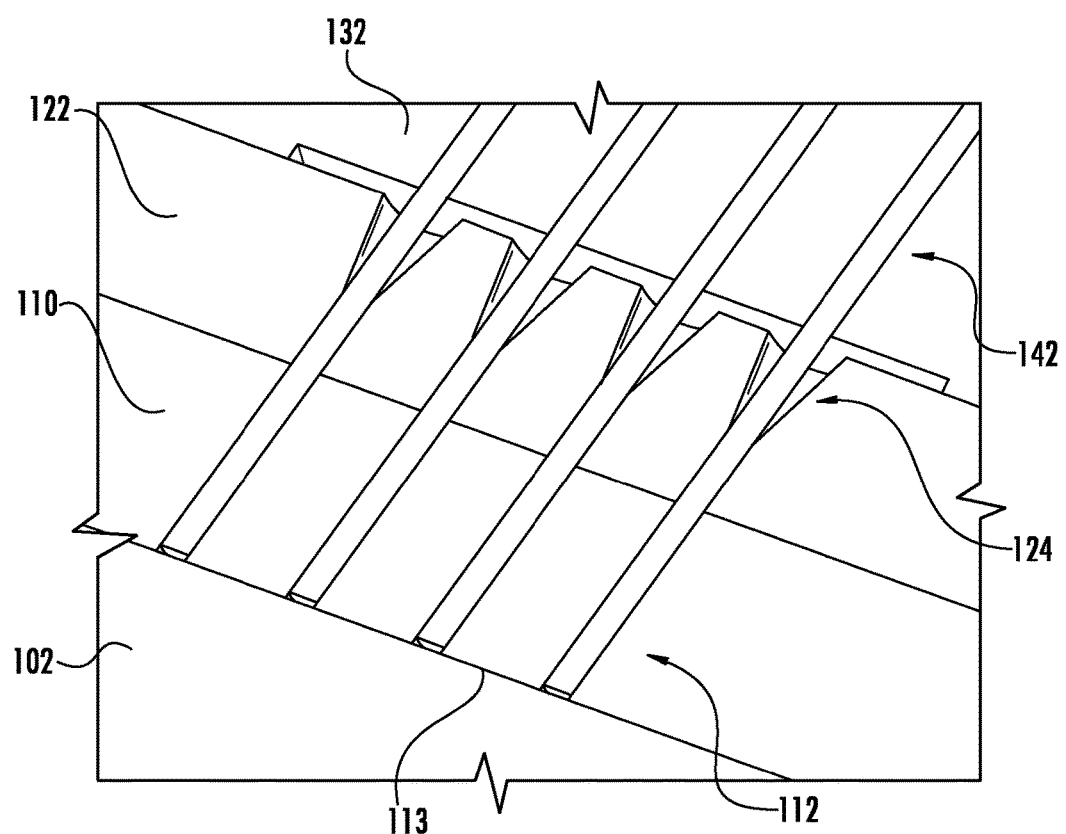
FIG. 4B is a close-up, perspective view of a plurality of optical fibers disposed within fiber support bores of the interposer and the receptacle body of the optical connector system depicted in FIG. 1.

FIG. 4B depicts a close-up cross sectional view of the stripped portion 142 of the optical fibers 140 fully inserted into both the receptacle fiber support bores 126 and the interposer fiber support bores 112 through an interface 113 between the laser silicon chip 102 and the interposer 110.

Figure 4C:
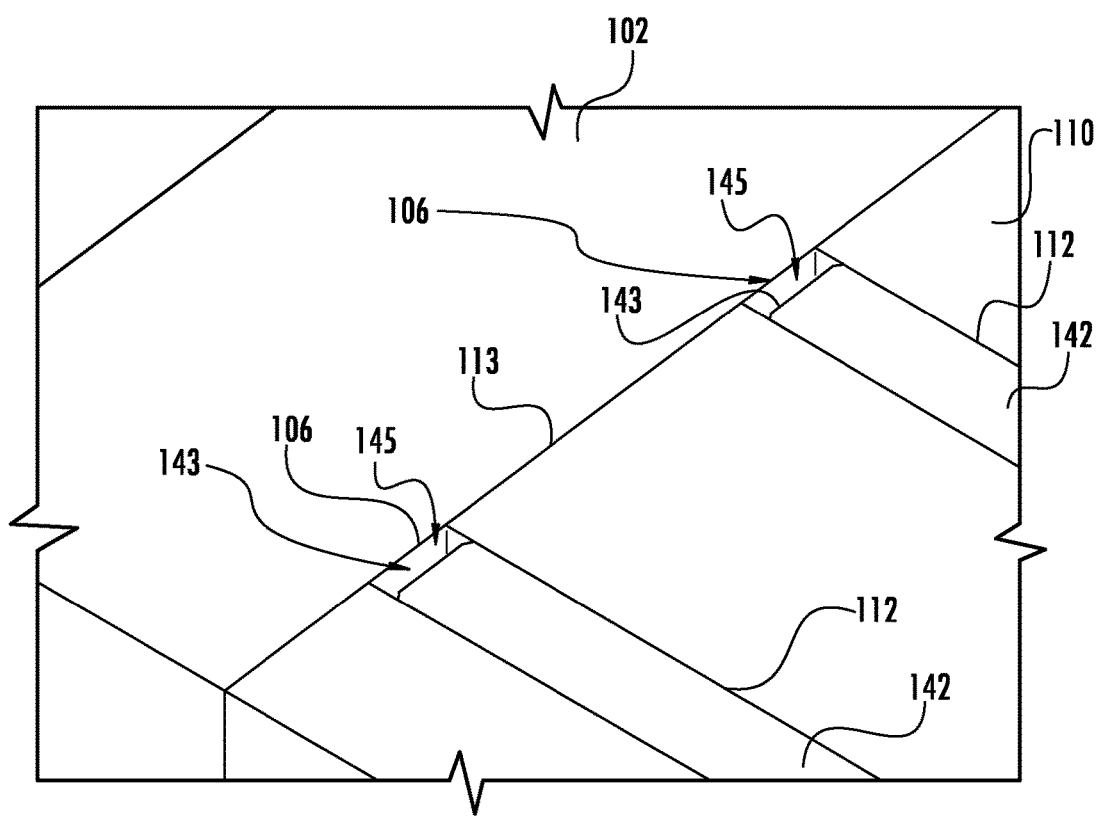
FIG. 4C is a close-up, perspective view of ends of optical fibers aligned with a laser emitting surface of the laser silicon chip of the optical connector system depicted in FIG. 1.

FIG. 4C depicts a close-up cross sectional view of the interface 113 between the interposer 110 and the laser silicon chip 102. As stated above, the interposer 110 includes one or more interposer fiber support bores 112 that are precisely positioned to align the end 143 of each optical fiber 140 (shown as stripped portion 142 in FIGS. 4B and 4C) with a grating 106 on the laser emitting surface 103 of the laser silicon chip 102. As described in more detail below, the gratings 106 are configured to turn laser beams propagating within the laser silicon chip 102 such as in a direction that is generally parallel to the laser emitting surface 103 (see FIG. 1) such that they are emitted from the laser emitting surface 103. The gratings 106 also act as lenses to optically couple the ends 143 of the optical fibers 140 to the laser silicon chip 102 such that laser beams may pass therebetween.

As shown in FIG. 4C, the ends 143 of the optical fibers 140 are positioned within the interposer fiber support bores 112 such that they are offset from the gratings 106 at the laser emitting surface 103 of the laser silicon chip 102. As such, there is a gap 145 between the ends 143 of the optical fibers 140 and the gratings 106. As an example and not a limitation, the offset distance between the ends 143 of the optical fibers 140 and the gratings may be 25 μm. However, it should be understood that the offset distance may vary.

Figure 4D:
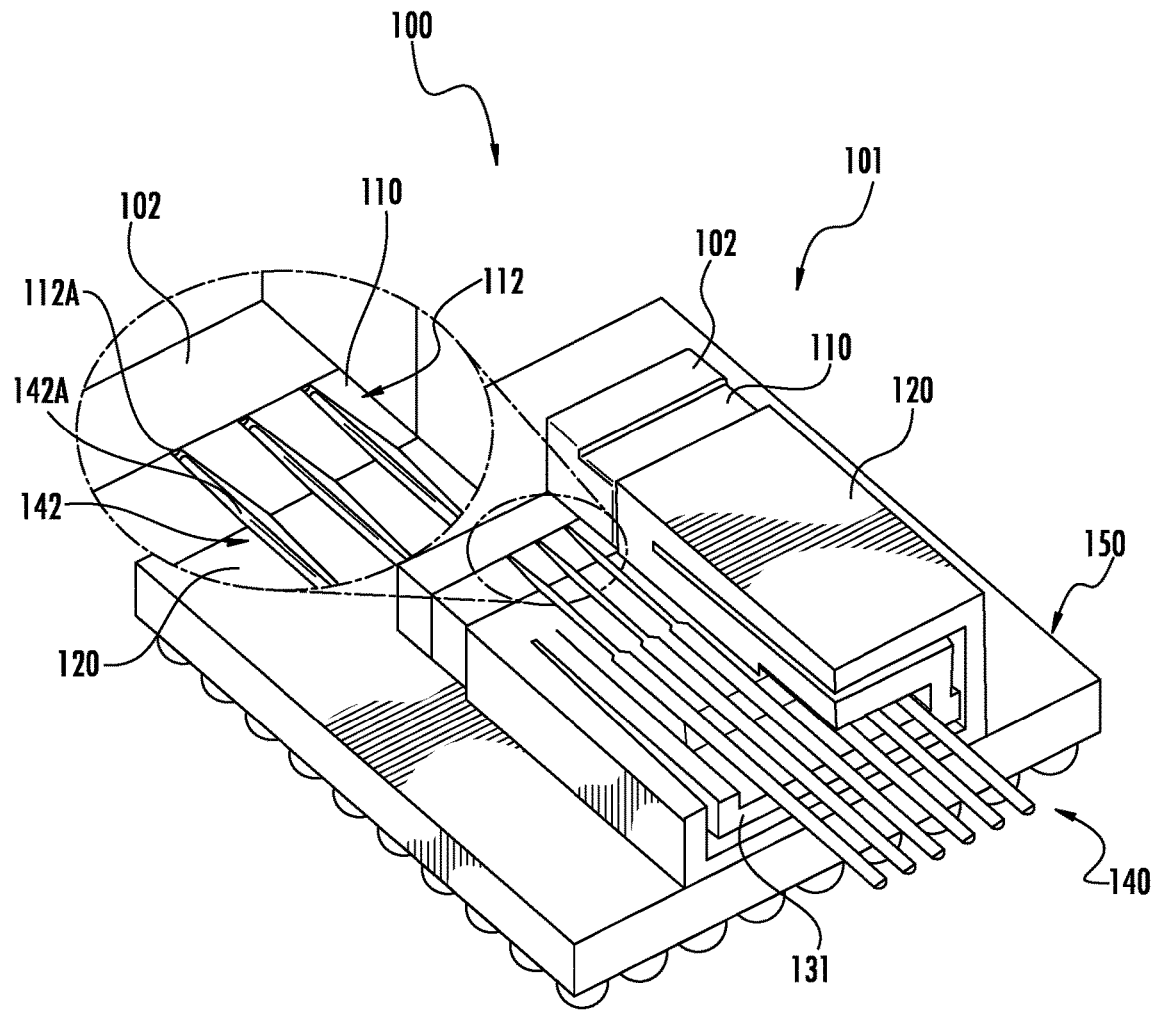
FIG. 4D is a cross sectional, perspective view of the optical connector system depicted in FIG. 1.

FIG. 4D depicts a rear perspective, cutaway view of the optical connector assembly 130 fully seated within the optical port 101, as well as a close-up view of the stripped portions 142 of the optical fibers positioned within the interposer fiber support bores 112 of the interposer 110. The ends 143 of the optical fibers 140 may be offset from the gratings 106 by precisely positioned optical fibers 140 within the optical connector assembly 130 or by the use or hard stop features that ensure the proper distance between the ends 143 of the optical fibers 140 and the gratings 106. In some embodiments, one or more non-signal optical fibers 142A may be provided within the optical connector assembly 130. These "dummy" optical fibers are dark and do not carry optical information. The non-signal optical fibers 142A, which may be positioned as the outermost optical fibers, for example, may have a length configured such that they contact the laser emitting surface 103. The remaining active, signal optical fibers of the plurality of optical fibers 140 may be shorter than the one or more non-signal optical fibers 142A, thereby ensuring a gap between the ends 143 of the signal optical fibers and the gratings 106.

Figure 5:
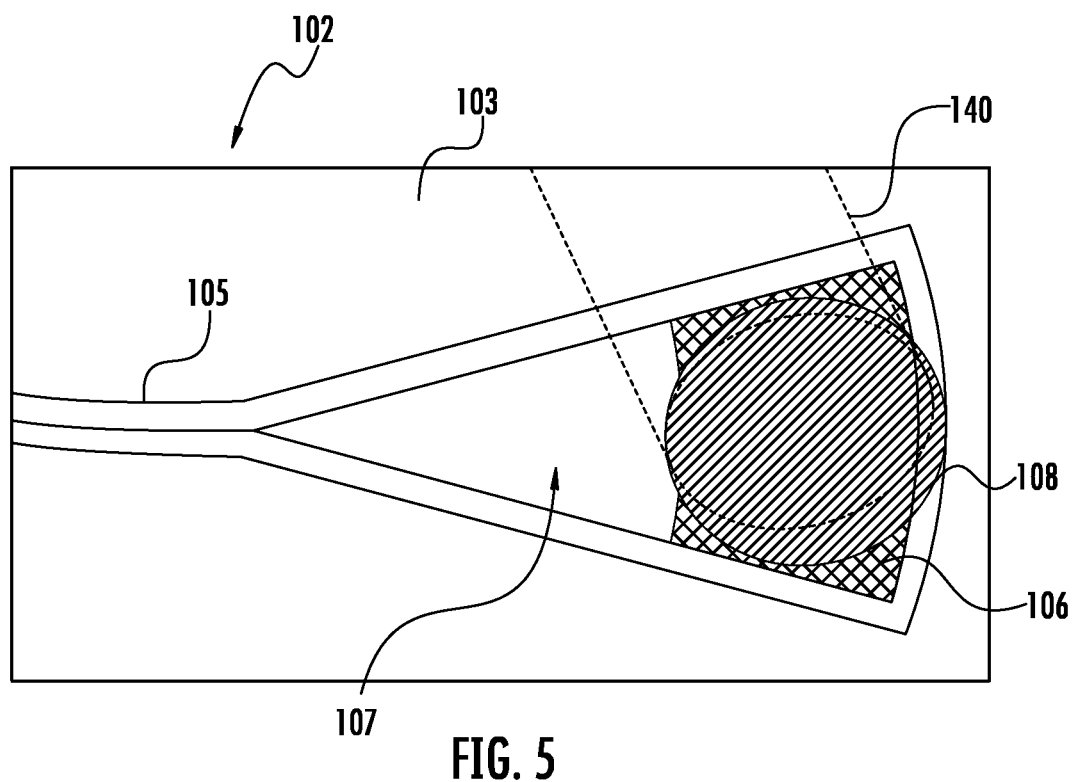
FIG. 5 is a schematic view of an example waveguide and grating of a laser silicon chip according to one or more embodiments described and illustrated herein.

Referring now to FIG. 5, a portion of an example laser emitting surface 103 of a laser silicon chip 102 is schematically illustrated. It should be understood that embodiments described herein are not limited to the laser silicon chip 102 depicted in FIG. 5 as other laser silicon chip 102 configurations are possible. A waveguide 105 is disposed within the laser silicon chip 102 within a plane that is generally parallel to the laser emitting surface 103. The waveguide 105, which may be a patterned silicon waveguide or any other type of waveguide, is optically coupled to one or more optical devices (not shown), such as one or more lasers (e.g., one or more silicon lasers and/or one or more group III-V semiconductor lasers) and/or one or more photo-detectors. The example waveguide 105 terminates in a horn section 107 wherein a light scattering grating 106 is positioned. An optical fiber 140 is schematically shown as being orthogonally positioned with respect to the laser emitting surface 103 at the grating 106. The grating 106 is patterned such that a laser beam 108 propagating within the waveguide 105 is scattered and then "turns" outwardly out of the grating 106 orthogonally from the laser emitting surface 103. The grating 106 also focuses the laser beam 108 so as to perform a lens function. The grating 106 also couples a laser beam emitted from the optical fiber 140 into the waveguide 105 were it may then be received by one or more photo-detectors.

Figure 6:
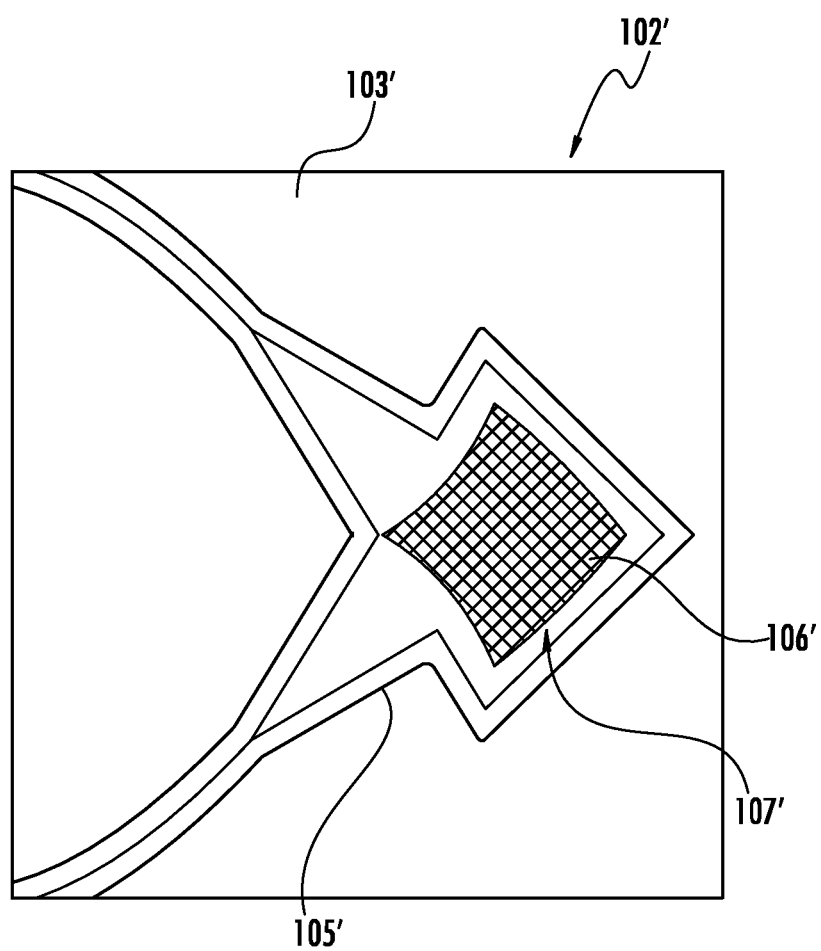
FIG. 6 depicts an example waveguide and grating of a laser silicon chip according to one or more embodiments described and illustrated herein.

FIG. 6 depicts another embodiment of a portion of a laser emitting surface 103' of a laser silicon chip 102' with an alternatively shaped waveguide 105', horn portion 107' and grating 106'.

Figure 7A:
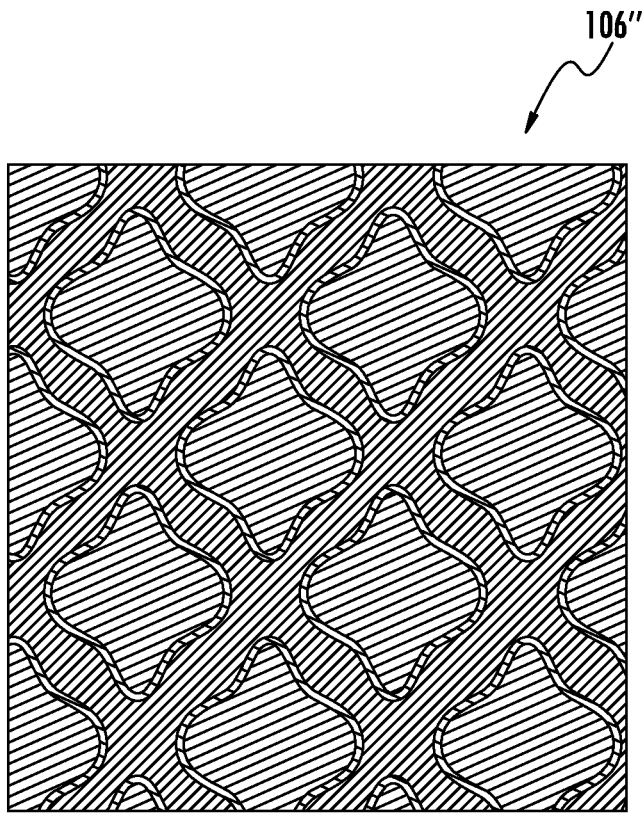
FIG. 7A depicts an example grating of a laser silicon chip according to one or more embodiments described and illustrated herein.
Figure 7B:
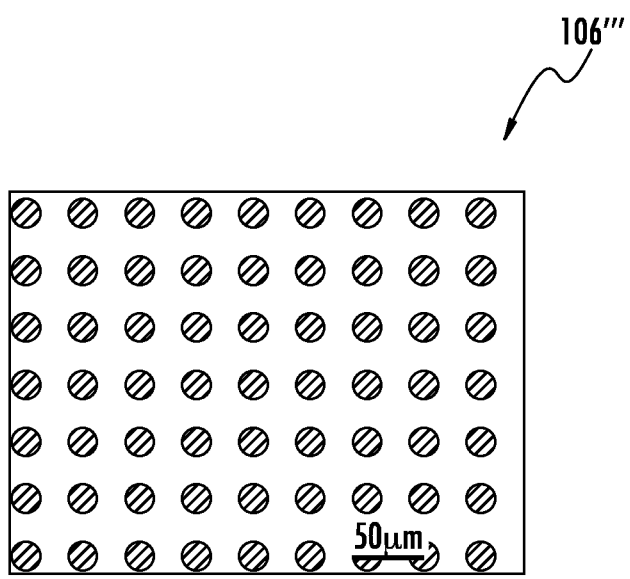
FIG. 7B depicts an example grating of a laser silicon chip according to one or more embodiments described and illustrated herein.

FIGS. 7A and 7B depict exemplary patterns for two gratings 106" and 106'", respectively. As a non-limiting example, the individual holes of gratings 106'" have a diameter of about 20 μm and a pitch of about 40 μm. The pattern of the gratings may be any pattern that scatters a laser beam in a manner suitable for optical coupling with an optical fiber 140. As an example and not a limitation, the gratings 106 may be fabricated by deep reactive ion etching of the silicon laser emitting surface 103.

Figure 8A:
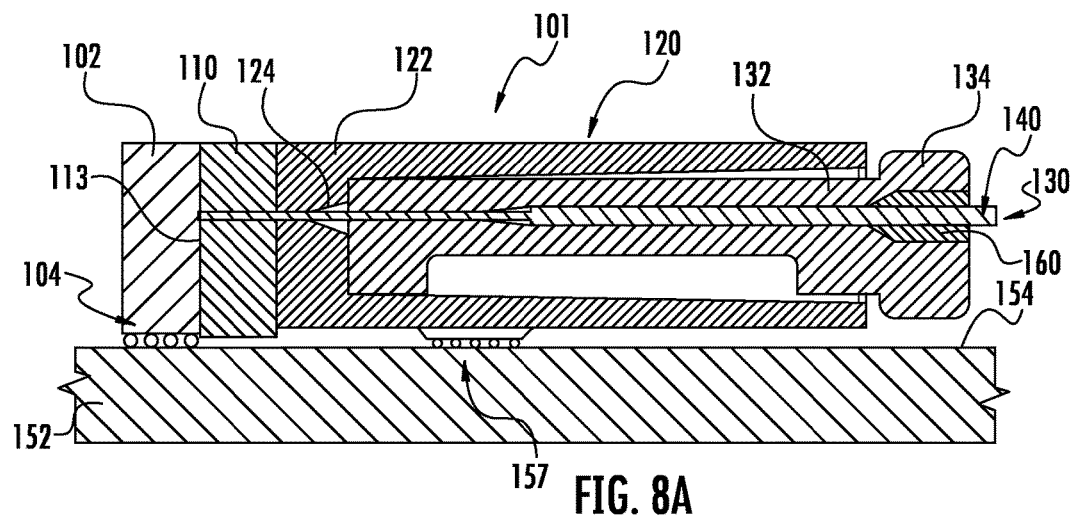
FIG. 8A is a cross sectional view of the optical connector system depicted in FIG. 1 prior to an adhesive backfill process according to one or more embodiments described and illustrated herein.
Figure 8B:
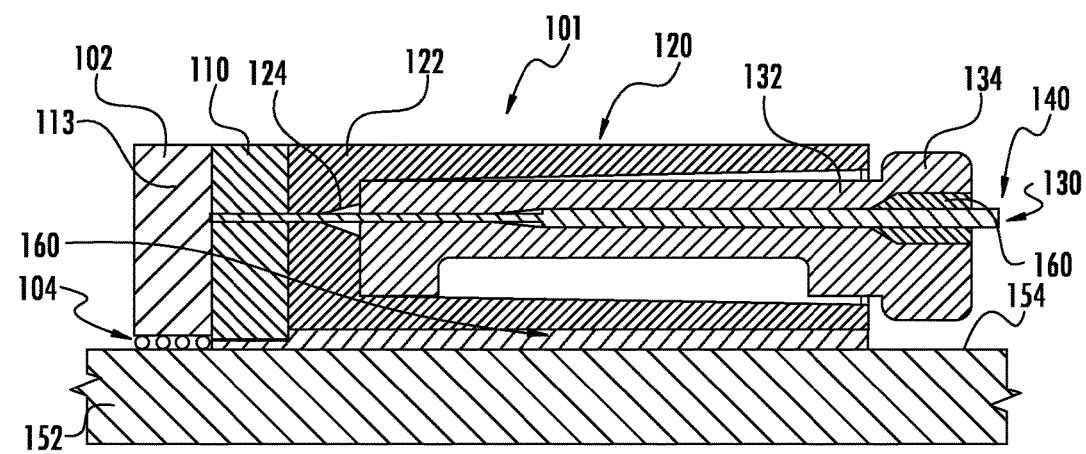
FIG. 8B is a cross sectional view of the optical connector system depicted in FIG. 1 after an adhesive backfill process according to one or more embodiments described and illustrated herein.

FIGS. 8A and 8B depict a cross sectional views of a process to bond the optical port 101 to the mounting surface 154 of the substrate assembly 150. The interposer 110 is wafer-scale aligned to the laser silicon chip 102 and then bonded with an optical bonding adhesive. Once aligned and bonded, the assembly may be diced. The alignment process may provide about an alignment tolerance of about ±1.0 µm. The bonded laser silicon chip 102 and interposer 110 is aligned and bonded to the receptacle mating surface 124 of the receptacle body 122 using an optical bonding adhesive. In some embodiments, the receptacle body 122 is passively aligned to the interposer 110 using a pin-based fixture.

In the illustrated embodiment, the receptacle 120 comprises an electrical contact 157 for connecting the receptacle 120 to the mounting surface 154 of the substrate assembly 150. To minimize CTE mismatch-related stress, the electrical contact 157 may be positioned at an end close to the receptacle mating surface 125. Further, as stated above, the laser silicon chip 102 includes an electrical coupling interface 104 (e.g., a ball grid array interface) for electrically coupling the laser silicon chip 102 to the mounting surface 154 of the substrate assembly 150. The assembled laser silicon chip 102, interposer 110 and receptacle 120 may then be coupled to the substrate assembly 150 by a solder reflow process, for example.

The optical connector assembly 130 may be inserted into the receptacle 120 such that the ends of the optical fibers 140 are disposed within the interposer 110 and offset from the gratings 106 of the laser emitting surface 103 of the laser silicon chip 102. As stated above, the optical connector assembly 130 may be secured within the receptacle by mechanical features and/or by an adhesive.

The substrate assembly 150 may be coupled to a motherboard or other substrate (not shown), for example by a solder reflow process using the electrical coupling surface 156, which in FIG. 1 is illustrated as a ball grid array interface. As an example and not a limitation, the motherboard may be a component of a computing device of a data center.

An adhesive backfill process may be performed to minimize stress, such as stress due to CTE mismatch. In other embodiments, no adhesive backfill process may be performed. FIG. 8B illustrates an adhesive 160 following a backfill process. The adhesive 160 couples the various components to the mounting surface 154 of the substrate 152. Although FIG. 8B depicts full adhesive coverage, the adhesive 160 may be selectively located at specific locations (i.e., non-full coverage).

Figure 9:
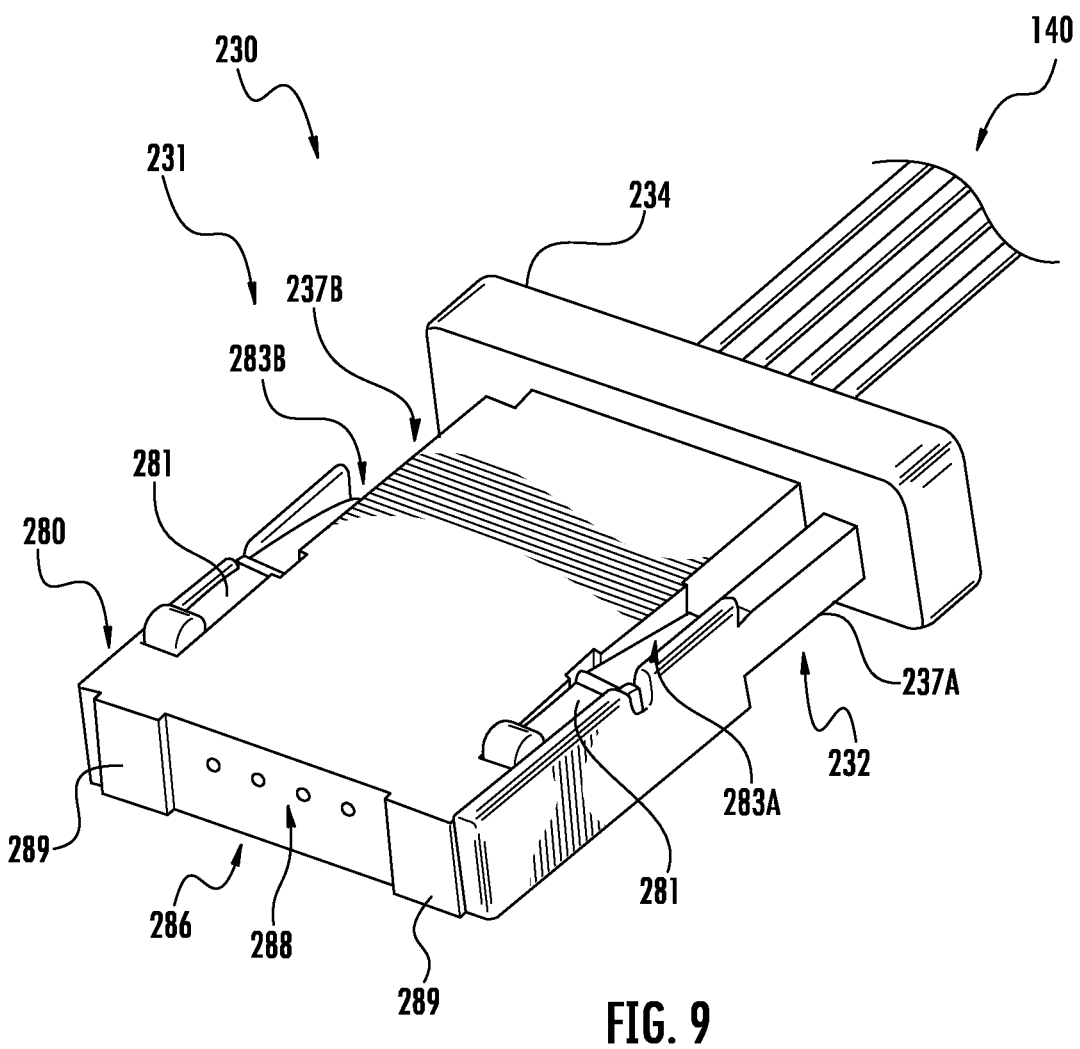
FIG. 9 is a perspective view of an example optical connector assembly according to one or more embodiments described and illustrated herein.

Referring now to FIG. 9, a front perspective view of another optical connector assembly 230 is depicted. As described in more detail below, the illustrated optical connector assembly 230 includes a shroud body 280 that, when in an advanced position, is configured to surround and protect the stripped portion 142 of the optical fibers 140 when the optical connector assembly 230 is not mated with a corresponding optical port. The shroud body 280 is operable to translate back toward a flange portion 234 to expose the stripped portion 142 of the optical fibers 140 only when the optical connector assembly is inserted into an optical port. Accordingly, the shroud body 280 acts as a "lock out" shutter that protects the optical fibers 140 when the optical connector assembly 230 is not mated with an optical port.

Figure 10:
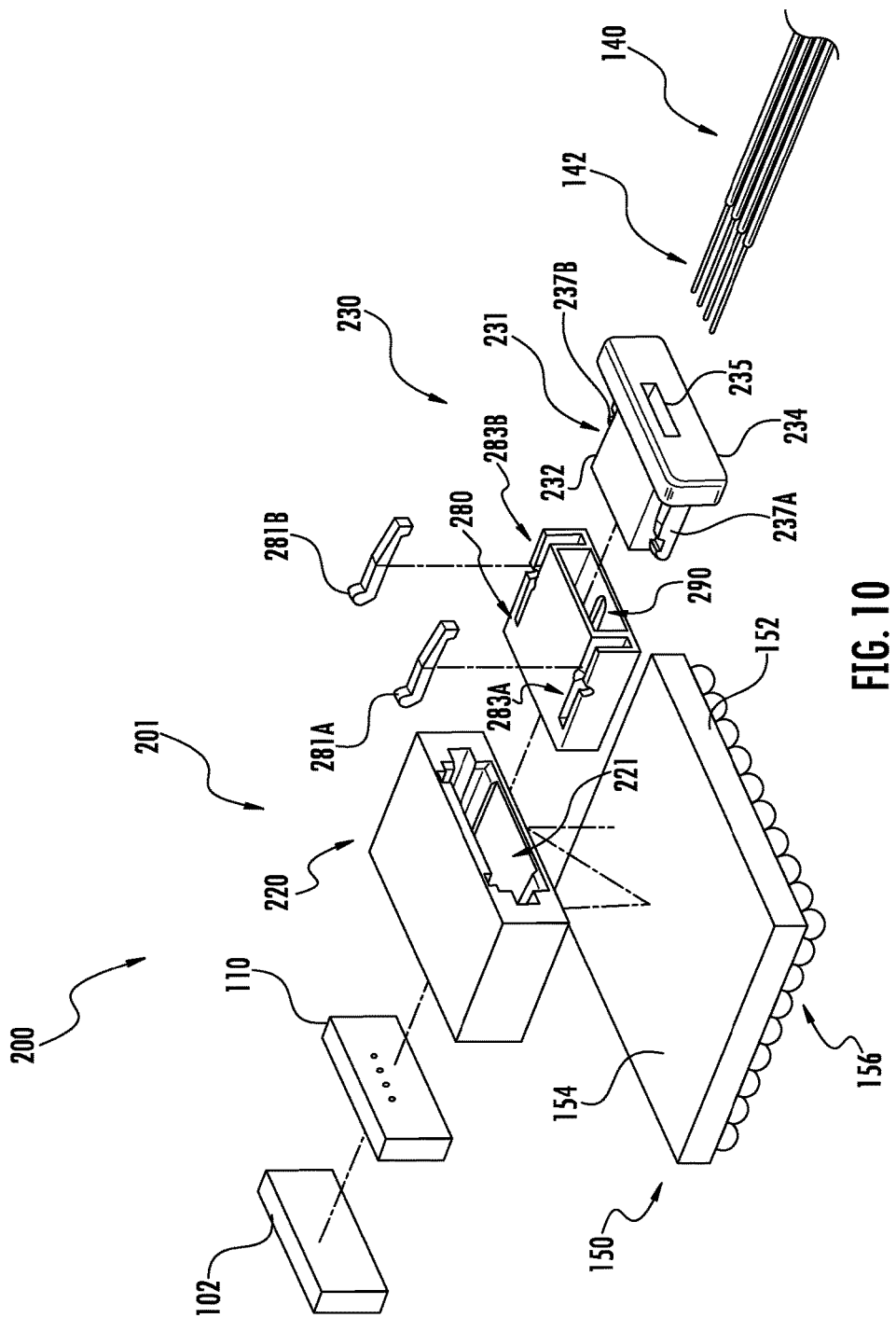
FIG. 10 is an exploded view of an example optical connector system including an optical port and the optical connector assembly depicted in FIG. 9 according to one or more embodiments described and illustrated herein.

FIG. 10 depicts a perspective, exploded view of an example optical connector system 200. The illustrated optical connector system includes an optical port 201 and the optical connector assembly 230 illustrated in FIG. 9. The optical connector system 200 includes some of the components described above with respect to FIGS. 1-8B, such as a substrate assembly 150, a laser silicon chip 102, an interposer 110, and optical fibers 140. The optical connector system 200 further includes a receptacle 220 similar to the receptacle 120 described above but having a receptacle body 222 defining a receptacle enclosure 221 operable to receive the shroud body 280 of the optical connector assembly 230. The receptacle body 222 includes receptacle fiber support bores 226 (see FIG. 12) as described above. Additionally, the receptacle 220 and the laser silicon chip 102 may be coupled to the substrate assembly 150 as described above.

Referring to both FIGS. 9 and 10, the illustrated optical connector assembly 230 includes a connector body 231 having a flange portion 234 and a fiber enclosure portion 232 extending from the flange portion 234. Additionally, a first shroud actuation arm 237A and a second shroud actuation arm 237B extend from the flange portion 234 adjacent opposite sides of the fiber enclosure portion 232. As described above with respect to connector body 131, the flange portion 234 includes an opening 235 that provides access for the optical fibers 140.

The shroud body 280 defines a shroud enclosure 290 configured to receive the fiber enclosure portion 232 of the connector body 231. The shroud body 280 further includes a first shroud actuator seat 283A adjacent a first side of the shroud enclosure 290 and a second shroud actuator seat 283B adjacent a second side of the shroud enclosure 290. The first and second shroud actuation arms 237A, 237B are disposed within the first and second shroud actuator seats 283A, 283B. The optical connector assembly 230 further includes a first shroud actuator pin 281A pivotably disposed within the first shroud actuation seat 283A above the first shroud actuator arm 237A, and a second shroud actuator pin 281B pivotably disposed within the second shroud actuation seat 283B above the second shroud actuator arm 237B.

Figure 12:
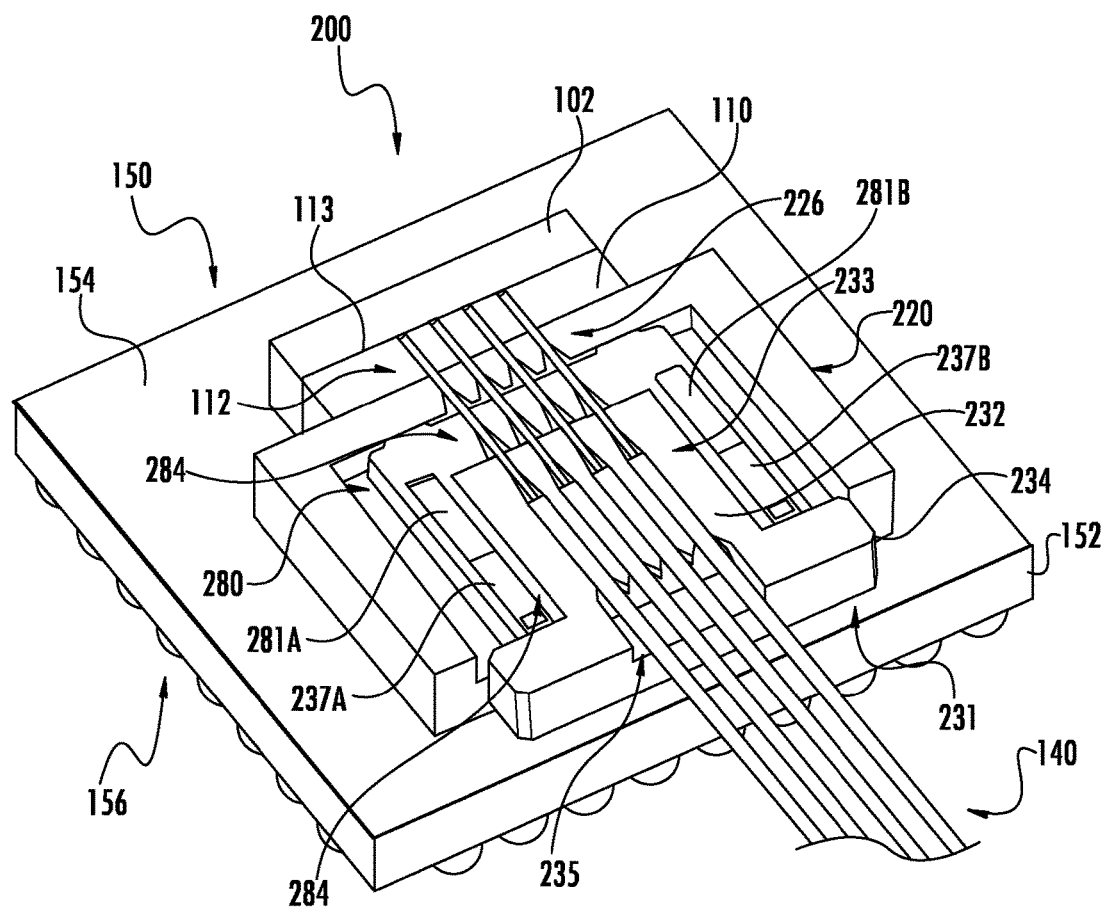
FIG. 12 is a cross sectional, perspective view of the optical connector system depicted in FIG. 10 with the optical connector system fully inserted into the optical port.

Referring once again to FIG. 9, the shroud body 280 further includes a shroud mating surface 286 having one or more fiber openings 288 defined by interior shroud fiber support bores 284 (see FIG. 12).

Figure 11A:
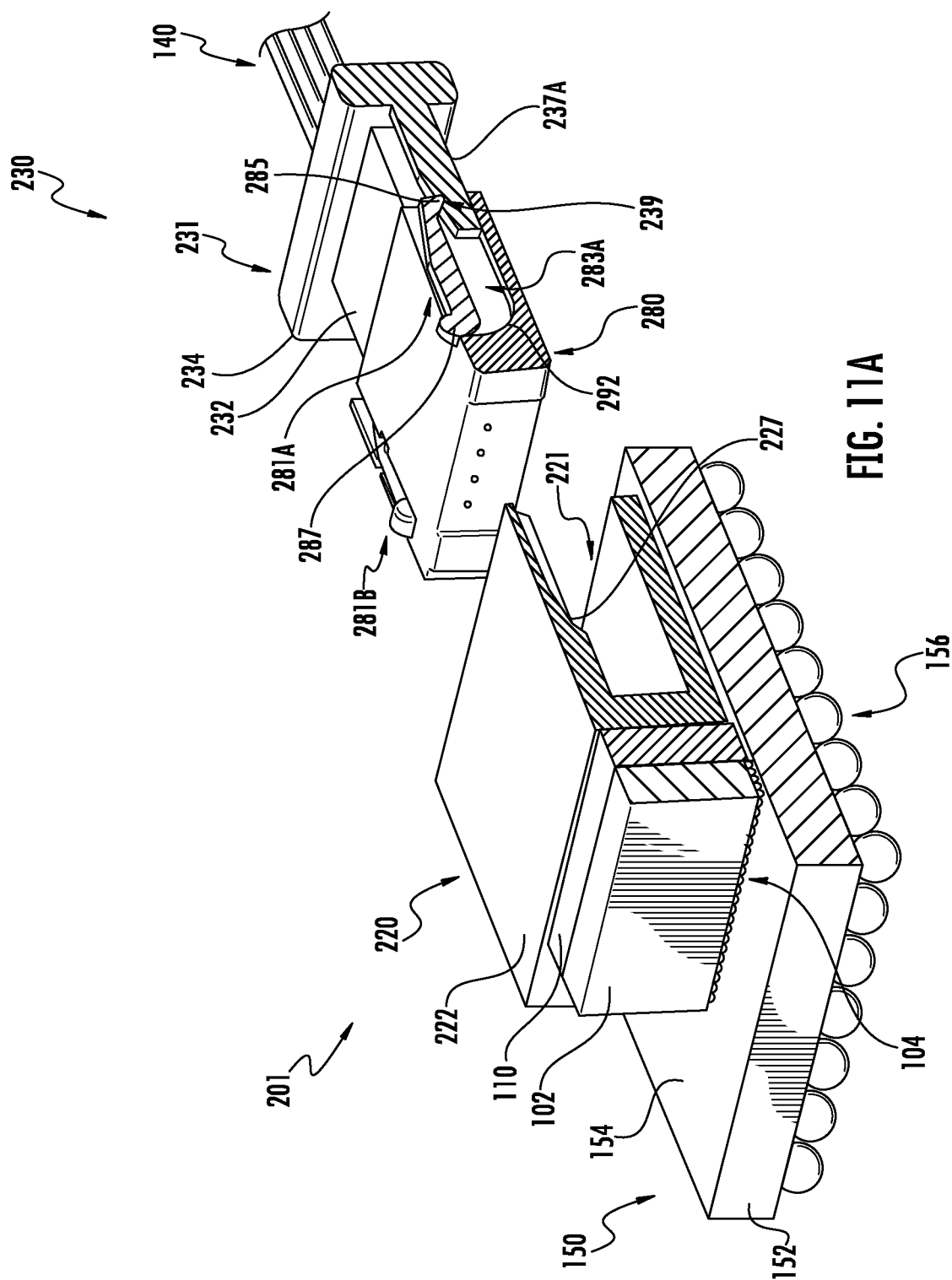
FIGS. 11A-11E are cross sectional, perspective views of the optical connector system depicted in FIG. 10 with the optical connector assembly at various stages of insertion into the optical port.

Referring now to FIG. 11A, an optical port 201 and an optical connector assembly 230 are shown in an unmated stated in a perspective, cross sectional view. The shroud body 280 is in a forward, advanced position such that the optical fibers 140 do not extend beyond a plane defined by the shroud mating face 286. The first and second shroud actuator pin 281A, 281B each comprise a shroud engagement portion 287 at a first end and a locking feature 285 at a second, opposite end. The example locking feature 285 is configured as a hooked feature, while the shroud engagement portion 287 has a rounded configuration for engaging an angled interior surface 227 of the receptacle body 222. The first and second shroud actuator seats 283A, 283B have a rounded end 292 for enabling a pivoting motion of the first and second shroud actuator pins 281A, 281B, within the first and second shroud actuator seats 283A, 283B, respectively.

The first and second shroud actuator arms 237A, 237B each include a locking notch 239. As shown in FIG. 11A, the locking feature 285 of the first and second shroud actuation pins 281A, 281B is positioned within the locking notch 239 of the first and second shroud actuation arms 237A, 237B, respectively, when the optical connector assembly 230 is in an unmated state. Additionally, the shroud engagement portion 287 of the first and second shroud actuation pins 237A, 237B contact an end surface of the first and second shroud actuation seats 283A, 283B, respectively. Accordingly, axial translation of the shroud body 280 toward the flange portion 234 is inhibited when the optical connector assembly 230 is in an unmated state.

Figure 11B:
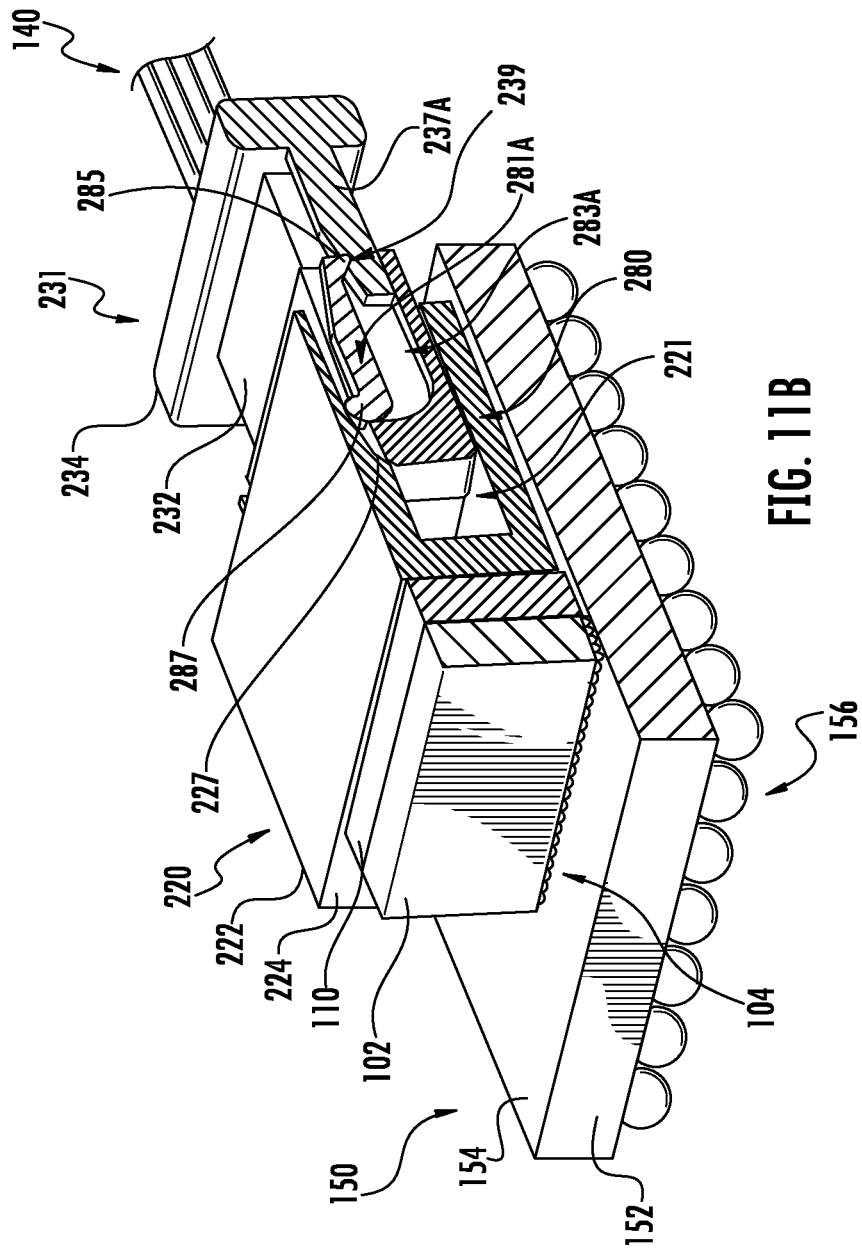

FIG. 11B depicts the optical connector assembly 230 partially inserted into the receptacle enclosure 221 defined by the receptacle body 222. The receptacle body 222 has an angled interior surface 227 such that a height of the receptacle enclosure 221 decreases in a direction from the opening of the receptacle enclosure 221 toward the receptacle mating surface 224. As shown in FIG. 11B, the shroud engagement portions 287 of the first and second shroud actuation pins 281A, 281B have just contacted the angled interior surface 227 but not enough to pivot the first and second shroud actuation pins 281A, 281B.

Figure 11C:
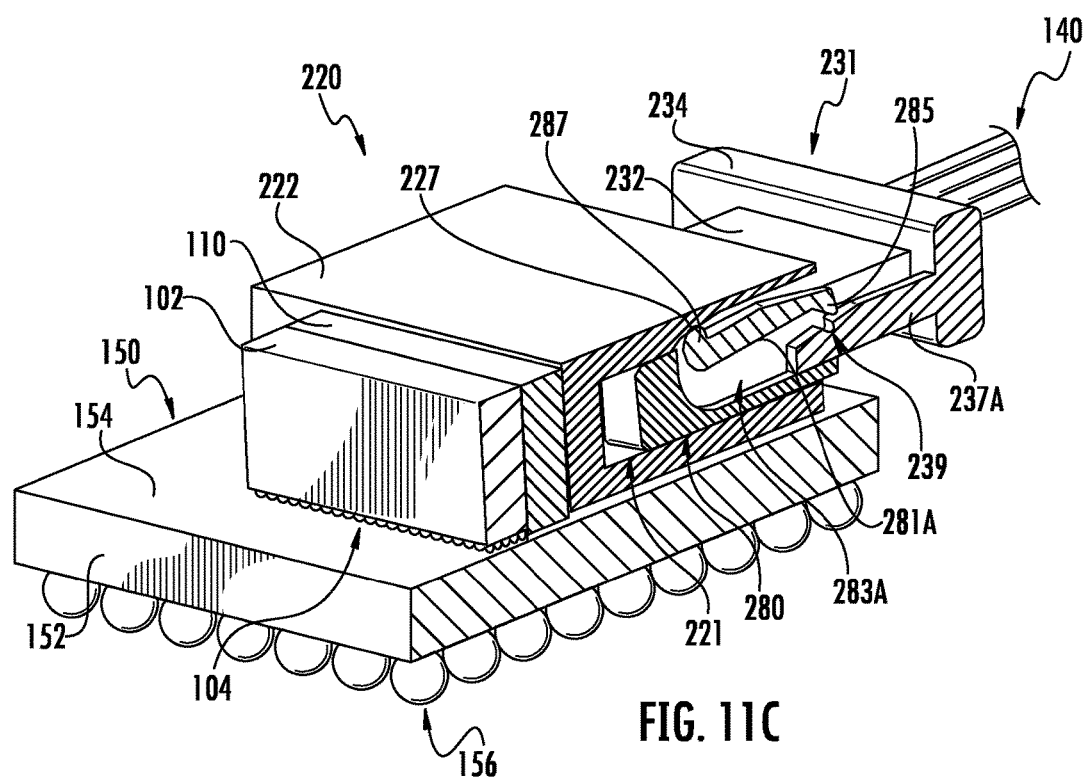
Figure 11D:
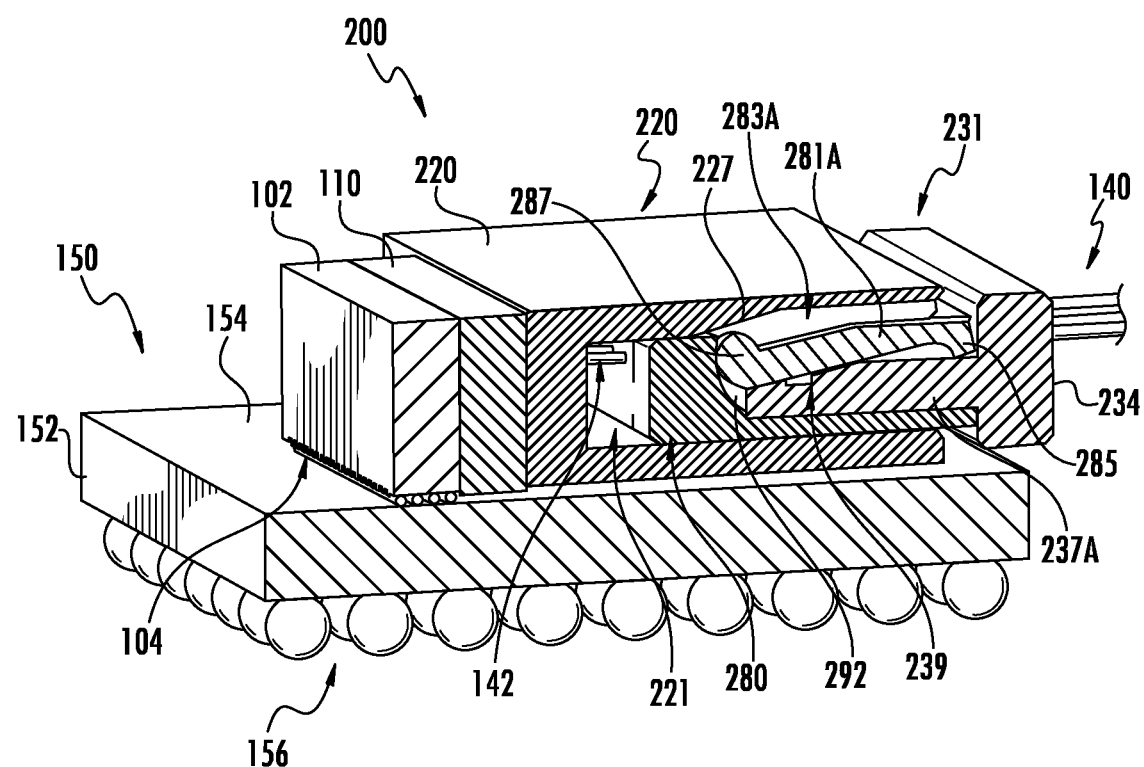

FIG. 11C depicts the optical connector assembly 230 further inserted into the receptacle enclosure 221. The contact between the shroud engagement portions 287 and the angled interior surface 227 causes the first and second shroud actuation pins 281A, 281B to pivot within the first and second shroud actuation seats 283A, 283B, respectively, such that the locking features 285 are disengaged from the locking notches 239 of the first and second shroud actuation arms 237A, 237B. Referring to FIG. 11D, disengagement of the locking features 285 from the locking notches 239 allows the shroud body 280 to translate back toward the flange portion 234. This translation of the shroud body 280 exposes the stripped portion 142 of the optical fibers 140.

Figure 11E:
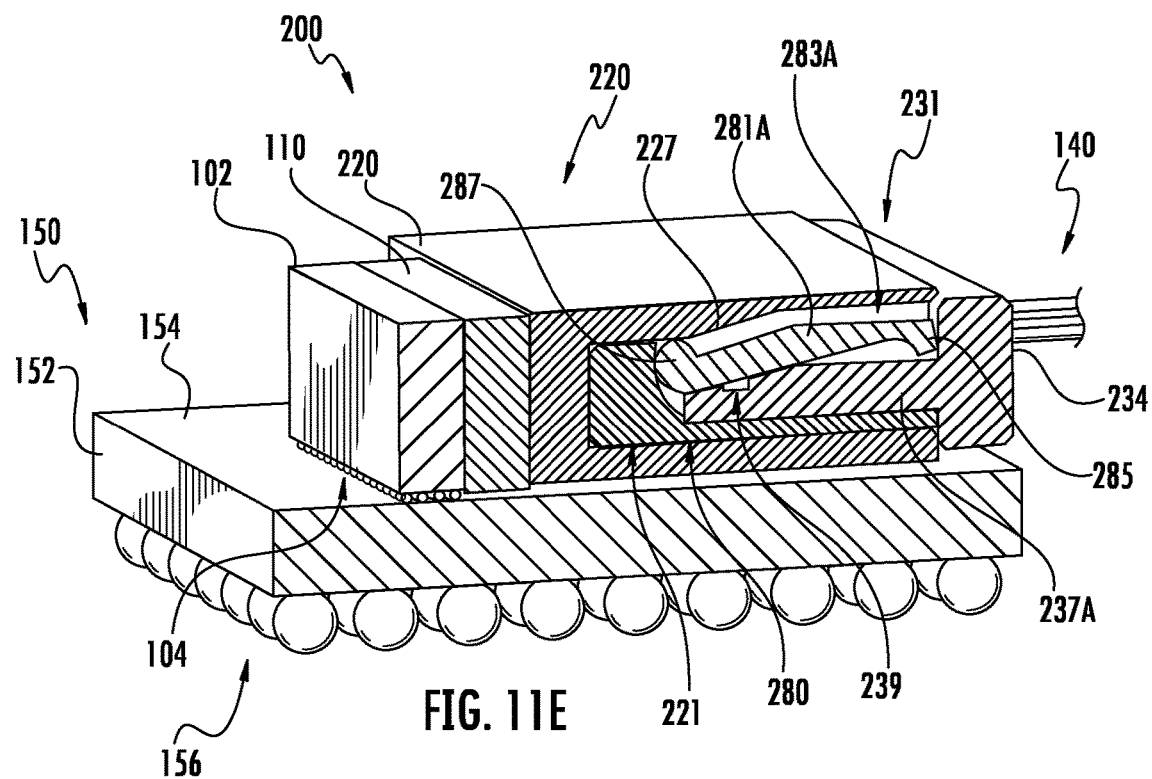

FIG. 11E depicts a cross sectional view of the optical connector assembly 230 fully inserted into the receptacle enclosure 221 defined by the receptacle body 222. The shroud body 280 is in a fully retracted position. FIG. 12 depicts another cross sectional view of the fully inserted optical connector assembly 230. FIG. 12 shows the nested relationship between the various components. By translating the shroud body 280 back toward the flange portion 234, the stripped portions 142 of the optical fibers 140 are exposed and extend beyond the shroud mating surface 286. Accordingly, the optical fibers are disposed within the connector fiber support bores 233, the shroud fiber support bores 284, the receptacle fiber support bores 226, and the interposer fiber support bores 112 for alignment with the laser silicon chip 102 as described above. It is noted that the shroud fiber support bores 284 may also be tapered to provide for ease of insertion of the optical fibers.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:
1. An optical connector system comprising:
an optical port comprising:
   a substrate comprising a mounting surface;
   a laser silicon chip comprising:
      a laser beam emitting surface, wherein the laser silicon chip is coupled to the substrate such that the laser beam emitting surface is transverse to the mounting surface of the substrate; and
      a grating at the laser beam emitting surface;
   an interposer comprising an interposer fiber support bore, wherein the interposer is coupled to the laser beam emitting surface of the laser silicon chip such that the interposer fiber support bore is substantially aligned with the grating of the laser silicon chip; and
   a receptacle housing comprising an receptacle mating surface and defining an enclosure, wherein:
      the receptacle mating surface comprises a receptacle fiber support bore; and
      the receptacle housing is coupled to the mounting surface of the substrate such that the receptacle fiber support bore is substantially aligned with the interposer fiber support bore; and
an optical connector assembly comprising:
   a connector body comprising a connector mating surface and a connector fiber support bore, wherein the connector fiber support bore defines a connector fiber opening at the connector mating surface, and the connector body defines a fiber enclosure portion; and
   an optical fiber disposed within the connector fiber support bore such that a portion of the optical fiber extends out of the connector fiber opening and beyond a plane defined by the connector mating surface,
wherein when the optical connector assembly is positioned within the enclosure defined by the receptacle housing, the optical fiber is disposed within the receptacle fiber support bore and the interposer fiber support bore such that an end of the optical fiber is offset from the grating of the laser silicon chip.

2. The optical connector system of claim 1, wherein the grating is operable to cause a laser beam propagating in a direction parallel to the laser beam emitting surface to turn and be emitted from the laser beam emitting surface.

3. The optical connector system of claim 1, wherein:
the grating is one of a plurality of gratings;
the interposer fiber support bore is one of a plurality of interposer fiber support bores;
the receptacle fiber support bore is one of a plurality of receptacle fiber support bores;
the connector fiber support bore is one of a plurality of connector fiber support bores that defines a plurality of connector fiber openings at the connector mating surface;
the optical fiber is one of a plurality of optical fibers that is disposed within the plurality of connector fiber support bores;
the plurality of interposer fiber support bores is substantially aligned with the plurality of gratings; and
the plurality of receptacle fiber support bores is substantially aligned with the plurality of interposer fiber support bores.

4. The optical connector system of claim 3, wherein when the optical connector assembly is positioned within the enclosure defined by the receptacle housing:
the plurality of connector fiber support bores is substantially aligned with the plurality of receptacle fiber support bores; and
the end of each optical fiber of the plurality of optical fibers is offset from each grating of the plurality of gratings.

5. The optical connector system of claim 3, wherein:
one or more optical fibers of the plurality of optical fibers are non-signal optical fibers, and one or more of the optical fibers of the plurality of optical fibers are signal optical fibers;
the non-signal optical fibers contact the laser beam emitting surface of the laser silicon chip; and
the one or more signal optical fibers are offset from the from the grating of the laser silicon chip.

6. The optical connector system of claim 3, wherein each interposer fiber support bore of the plurality of interposer fiber support bores, each receptacle fiber support bore of the plurality of receptacle fiber support bores, and each connector fiber support bore of the plurality of connector fiber support bores are tapered.

7. The optical connector system of claim 1, further comprising a shroud body comprising a shroud mating surface and defining a shroud enclosure, wherein:
the shroud mating surface comprises a shroud fiber support bore;
the optical fiber is disposed within the shroud fiber support bore; and
the connector body is disposed within the shroud enclosure such that:
when the optical connector assembly is in an unmated state, the shroud body is in an advanced position such that the end of the optical fiber does not extend beyond a plane defined by the shroud mating surface and movement of the shroud body with respect to the connector body is inhibited; and
when the optical connector assembly is in a mated state within the enclosure of the receptacle housing, the shroud body is in a retracted position such that the optical fiber extends beyond the plane defined by the shroud mating surface and is disposed within the receptacle fiber support bore and the interposer fiber support bore.

8. The optical connector system of claim 1, further comprising:
a shroud body defining a shroud enclosure, the shroud body comprising:
a shroud mating surface;
a shroud fiber support bore extending between the enclosure and the shroud mating surface; and
a first shroud actuator seat positioned proximate a first side of the shroud enclosure, and a second shroud actuator seat positioned proximate a second side of the shroud enclosure; and
a first shroud actuator pin and a second shroud actuator pin, each of the first and second shroud actuator pins comprising a shroud engagement portion at a first end and a locking feature at a second end.

9. The optical connector system of claim 8, wherein:
at least a portion of the connector body is disposed within the shroud body; and
the first shroud actuator pin is disposed within the first shroud actuator seat and the second shroud actuator pin is disposed within the second shroud actuator seat such that movement of the shroud body with respect to the connector body is inhibited when the optical connector assembly is in an unmated state with respect to the optical port.

10. The optical connector system of claim 8, wherein:
the connector body further comprises:
a flange portion, wherein the fiber enclosure portion extends from the flange portion, and the connector mating surface is on the fiber enclosure portion;
a first shroud actuation arm extending from the flange portion proximate a first side of the fiber enclosure portion, the first shroud actuation arm comprising a first locking notch; and
a second shroud actuation arm extending from the flange portion proximate a second side of the fiber enclosure portion, the second shroud actuation arm comprising a second locking notch;
the connector body is disposed within the shroud body such that the fiber enclosure portion is disposed within the shroud enclosure, the first shroud actuation arm is disposed within the first shroud actuator seat, and the second shroud actuation arm is disposed within the second shroud actuator seat; and
the first shroud actuator pin is pivotally disposed within the first shroud actuator seat and the second shroud actuator pin is pivotally disposed within the second shroud actuator seat.

11. The optical connector system of claim 10, wherein:
when the optical connector assembly is in an unmated state with respect to the optical port, the shroud body is in an advanced position such that the end of the optical fiber does not extend beyond a plane defined by the shroud mating surface, and the shroud engagement portion of the first and second shroud actuator pins contacts an end surface of the first and second shroud actuator seats, respectively, such that the first and second locking features of the first and second shroud actuator pins are disposed within the first and second locking notches of the first and second shroud actuation arms, respectively, thereby inhibiting movement of the shroud body with respect to the connector body; and
when the optical connector assembly is inserted into the receptacle housing, the shroud engagement portion of the first and second shroud actuator pins contact an interior surface of the receptacle housing, which causes the first and second shroud actuator pins to pivot and disengage the first and second locking features of the first and second shroud actuator pins from the first and second locking notches of the first and second shroud actuation arms, respectively, thereby allowing the shroud body to retract and expose the optical fiber beyond the plane defined by the shroud mating surface.

12. The optical connector system of claim 11, wherein:
the grating is one of a plurality of gratings;
the interposer fiber support bore is one of a plurality of interposer fiber support bores;
the receptacle fiber support bore is one of a plurality of receptacle fiber support bores;
the connector fiber support bore is one of a plurality of connector fiber support bores;
the shroud fiber support bore is one of a plurality of shroud fiber support bores;
the optical fiber is one of a plurality of optical fibers that is disposed within the plurality of connector fiber support bores;
the plurality of interposer fiber support bores is substantially aligned with the plurality of gratings; and
the plurality of receptacle fiber support bores is substantially aligned with the plurality of interposer fiber support bores.

13. The optical connector system of claim 12, wherein when the optical connector assembly is positioned within the enclosure defined by the receptacle housing:
the plurality of connector fiber support bores is substantially aligned with the plurality of shroud fiber support bores;
the plurality of shroud fiber support bores is substantially aligned with the plurality of receptacle fiber support bores; and
the plurality of optical fibers is disposed within the plurality of shroud fiber support bores, the plurality of receptacle fiber support bores, and the plurality of interposer fiber support bores.

14. The optical connector system of claim 11, wherein the laser silicon chip comprises a ball grid array surface coupled to the mounting surface of the substrate.

15. The optical connector system of claim 11, wherein the interposer comprises silicon.

16. The optical connector system of claim 11, wherein the laser silicon chip, the interposer, and the receptacle housing are coupled to the mounting surface of the substrate by an adhesive backfill.

17. The optical connector system of claim 11, wherein the substrate comprises a ball grid array surface opposite from the mounting surface.

18. An optical connector system comprising:
an optical port comprising:
  a substrate comprising a mounting surface;
  a laser silicon chip comprising:
    a laser beam emitting surface, wherein the laser silicon chip is coupled to the substrate such that the laser beam emitting surface is transverse to the mounting surface of the substrate; and
    a grating at the laser beam emitting surface;
  an interposer comprising an interposer fiber support bore, wherein the interposer is coupled to the laser beam emitting surface of the laser silicon chip such that the interposer fiber support bore is substantially aligned with the grating of the laser silicon chip; and
  a receptacle housing comprising an receptacle mating surface and defining an enclosure, wherein:
    the receptacle mating surface comprises a receptacle fiber support bore; and
    the receptacle housing is coupled to the mounting surface of the substrate such that the receptacle fiber support bore is substantially aligned with the interposer fiber support bore; and
an optical connector assembly comprising:
  a connector body comprising a connector mating surface and a connector fiber support bore, wherein the connector fiber support bore defines a connector fiber opening at the connector mating surface, and the connector body defines a fiber enclosure portion;
  an optical fiber disposed within the connector fiber support bore such that a portion of the optical fiber extends out of the connector fiber opening and beyond a plane defined by the connector mating surface;
  a shroud body comprising a shroud mating surface and a shroud fiber support bore at the shroud mating surface, wherein at least a portion of the connector body is disposed within the shroud body and the optical fiber is disposed within the shroud fiber support bore; and
  a shroud actuation assembly configured such that when the optical connector assembly is in an unmated state with respect to an optical port, the shroud body is in an advanced position such that an end of the optical fiber does not extend beyond a plane defined by the shroud mating surface, and movement of the shroud body with respect to the connector body is inhibited,
wherein when the optical connector assembly is positioned within the enclosure defined by the receptacle housing, the optical fiber is disposed within the receptacle fiber support bore and the interposer fiber support bore such that an end of the optical fiber is offset from the grating of the laser silicon chip.

19. The optical connector assembly of claim 18, wherein the shroud activation assembly is configured such that when the optical connector assembly is inserted into an optical port, the shroud body is free to retract along the connector body to expose the optical fiber beyond the plane defined by the shroud mating surface.

20. The optical connector assembly of claim 19, wherein:
  the connector fiber support bore is one of a plurality of connector fiber support bores that defines a plurality of connector fiber openings at the connector mating surface;
  the shroud fiber support bore is one of a plurality of shroud fiber support bores; and
  the optical fiber is one of a plurality of optical fibers that is disposed within the plurality of connector fiber support bores.

21. The optical connector assembly of claim 20, wherein when the optical connector assembly is positioned within an optical port:
  the plurality of connector fiber support bores is substantially aligned with the plurality of shroud fiber support bores; and
  the plurality of optical fibers extend beyond the plane defined by the shroud mating surface.

* * * * *